United States Patent [19]

Bechtle et al.

[11] Patent Number: 4,900,088
[45] Date of Patent: Feb. 13, 1990

[54] BACK REST FOR A VEHICLE SEAT

[75] Inventors: Rudolf Bechtle, Lichtenstein; Jörg Resag, Filderstadt; Norbert Sommer, Remscheid, all of Fed. Rep. of Germany

[73] Assignee: Keiper Recaro GmbH & Co., Fed. Rep. of Germany

[21] Appl. No.: 308,623

[22] Filed: Feb. 10, 1989

[30] Foreign Application Priority Data

Feb. 12, 1988 [DE] Fed. Rep. of Germany ... 8801833[U]

[51] Int. Cl.$^4$ .............................................. B60N 1/02
[52] U.S. Cl. ..................................... 297/379; 292/28; 292/50
[58] Field of Search ................. 297/378, 379; 292/50, 292/28, 38; 296/65 R

[56] References Cited

U.S. PATENT DOCUMENTS

| | | | |
|---|---|---|---|
| 913,269 | 2/1909 | Dalhousie | 292/38 |
| 4,068,871 | 1/1978 | Mercer | 297/379 X |
| 4,484,776 | 11/1984 | Gokimoto et al. | 297/379 X |
| 4,561,694 | 12/1985 | Mouri et al. | 297/379 |
| 4,629,250 | 12/1986 | Tezuka et al. | 297/379 X |
| 4,639,040 | 1/1987 | Fujita et al. | 297/379 |
| 4,765,681 | 8/1988 | Houghtaling | 297/379 X |

Primary Examiner—Peter A. Aschenbrenner
Attorney, Agent, or Firm—Wigman & Cohen

[57] ABSTRACT

A back rest for a vehicle seat is adjustable in its angle of inclination about a pivot axis running in the direction lateral to the back can also be folded about a folding axis lying parallel to the pivot axis to facilitate access to the rear seat of the vehicle by releasing folding locks which are provided on respective sides of the back rest. The folding locks are provided with a locking member which is movable between a locking position and a release position. Each locking member is connected with one end of a cable, the other end of which is connected with an activating device arranged on the supporting portions of the back rest. The activating device has a support for a bolt, the support being immovable relative to the back rest. A double-armed pivot lever is arranged on the bolt, and the two arms of the lever are connected with respective cores of the cables at a distance from the rotational axis of the lever. The covers of the cable are supported on the support and the double-armed lever is connected with an activating member for releasing the lock from the locking position.

11 Claims, 2 Drawing Sheets

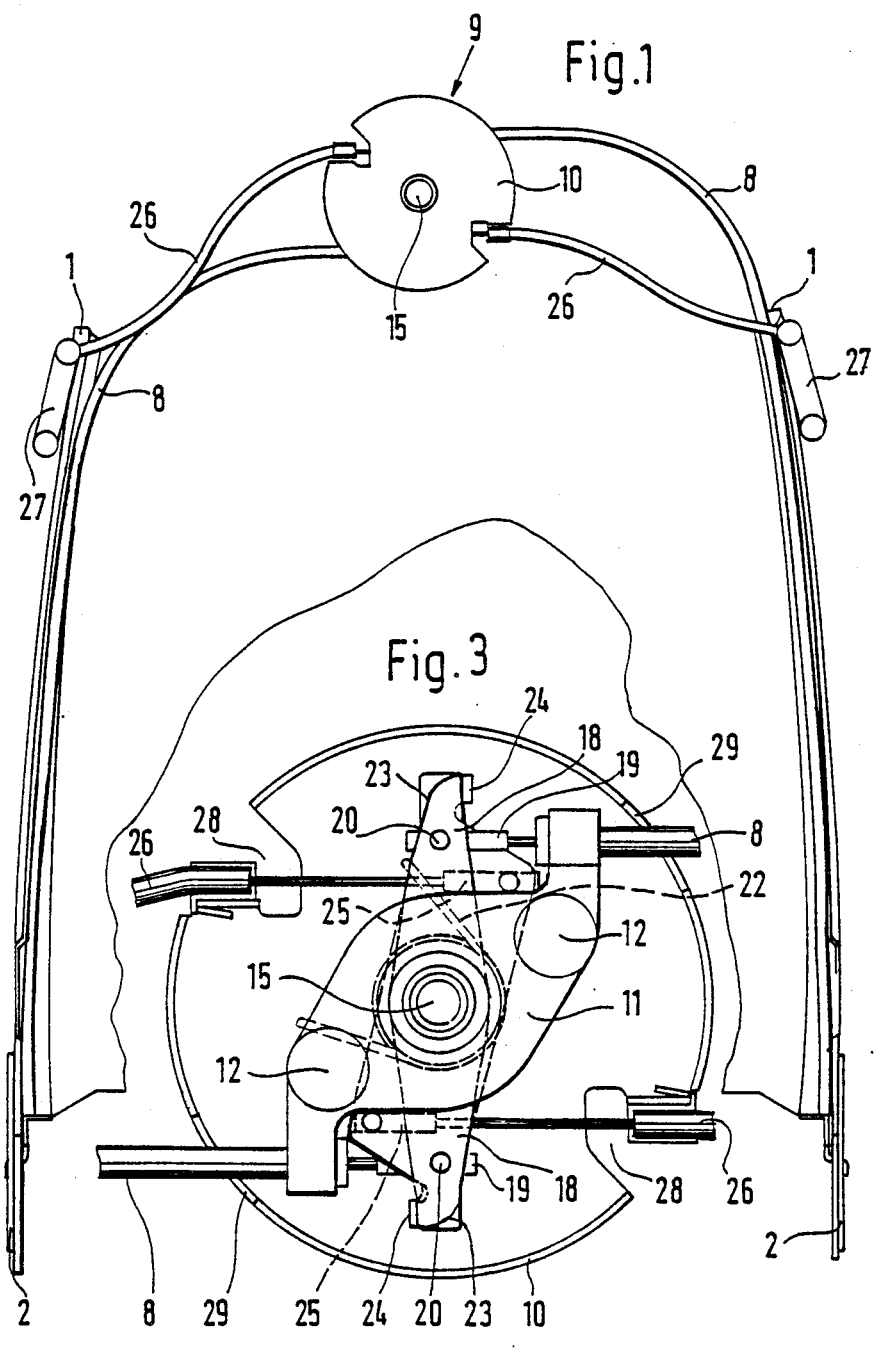

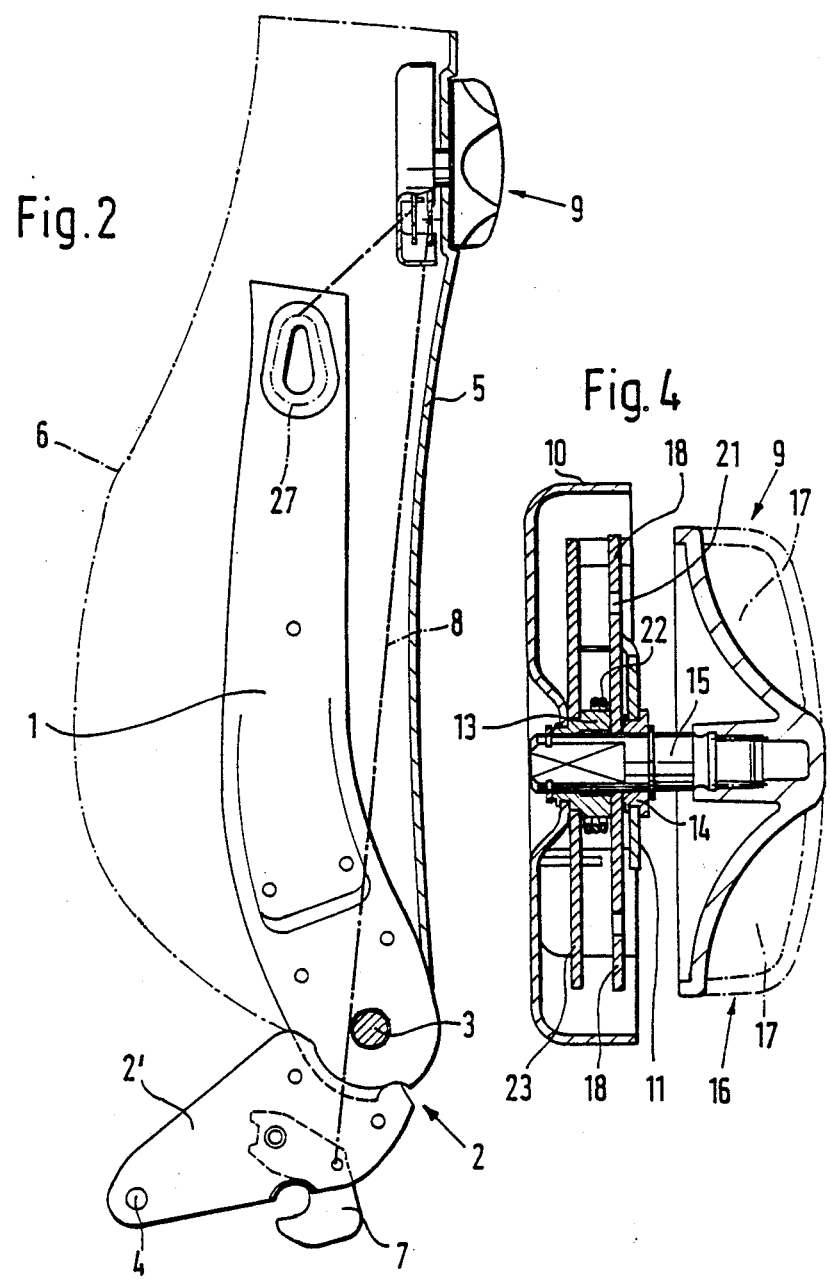

BACK REST FOR A VEHICLE SEAT

BACKGROUND OF THE INVENTION

The invention relates to a back rest for a vehicle seat, and more particularly to a motor vehicle seat that is adjustable in its angle of inclination about a pivot axis running in the direction lateral to the back rest and which can be folded about a folding axis lying parallel to the pivot axis to facilitate access to the rear seat of the vehicle by releasing folding locks which are provided on respective sides of the back rest.

DESCRIPTION OF THE PRIOR ART

In the known back rests of this type, a lever that extends from the back rest toward the adjacent portion of the chassis and is lifted upward manually, is provided on the side of the back rest to release the folding lock. In some situations it is difficult to activate this lever, especially when the back rest is located in close proximity to the side posts of the chassis.

SUMMARY AND OBJECTS OF THE INVENTION

In view of the foregoing limitations and shortcomings of the prior art devices, as well as other disadvantages not specifically mentioned above, is a primary object of the invention, therefore, to provide a back rest for a vehicle seat with an improved activation of the activating member for the folding lock.

Briefly described, the aforementioned object is accomplished according to the invention by providing a back rest having a folding lock on each of the two respective sides of the back, each of which folding lock is provided with a locking member movable between a locking position and a release position. Each locking member is connected with one end of a cable, the other end of which is connected with an activating device arranged on the supporting portions of the back rest. The activating device has a support for a bolt, the support being immovable relative to the back rest. A double-armed pivot lever is arranged on the bolt, and the two arms of the lever are connected with respective cores of the cables at a distance from the rotational axis of the lever. The covers of the cables are supported on the support and the double-armed lever is connected with an activating member for releasing the lock from the locking position.

The improved activation of the activating member is based, first of all, on the fact that the activating device does not have to be arranged on the side of the back rest, because its support can be arranged at any other suitable location on the back rest. In one preferred embodiment, for example, it is provided on the rear of the back rest, which renders it easily reachable for a person sitting in the rear seat, and is also easy to activate if the distance between the back rest and the chassis has been reduced as a result of a lateral impact during an accident. Another factor that contributes to improved activation is the fact that the two cables, which are preferably Bowden cables or other tensile cables, are connected to a double-armed pivot lever, so that a rotary movement exerted on this pivot lever is sufficient to release the folding back. Because the double-armed pivot lever can be arranged to rotate together with its supporting bolt, the rotary movement need only be exerted on the bolt. In another preferred embodiment, therefore, a wheel arranged to rotate with the bolt is provided as the activating member. The wheel has advantageous depressions arranged at intervals along the periphery as grips in order to enhance the grip of the fingers. Of course other pulling devices can be used instead of a Bowden or draw cable, for example, possibly with the use of diverting elements.

When the activating device is arranged on the rear of the back rest, in a preferred embodiment, one end of an additional cable is coupled with the double-armed pivot lever, and the other end thereof is coupled to a draw member provided on the side of the back rest and can be gripped by hand. If two additional cables are provided, both of which are coupled with the double-armed pivot lever, then a pulling member of this type can be arranged on each of the two sides of the back rest. The folding lock then can be released even in an emergency by activating this pulling member or one of the two pulling members. The pulling member advantageously takes the shape of a chain link, i.e., a circular or elongated ring.

As long as at least one additional cable is provided, a second lever can be rotatably mounted on the bolt axially adjacent to the double-armed pivot lever. This second lever, by means of at least one driver, causes the double-armed pivot lever to move in the sense of releasing the folding lock when it is activated by the additional cable or one of the two additional cables.

With the foregoing and other objects, advantages and features of the invention that will become hereinafter apparent, the nature of the invention may be more clearly understood by reference to the following detailed description of the invention and to the several views illustrated in the attached drawings.

BRIEF DESCRIPTION OF THE DRAWINGS

FIG. 1 is a partially illustrated rear view of the exemplary embodiment in accordance with the invention;

FIG. 2 is a partially illustrated and partially schematic sectional side view of the exemplary embodiment;

FIG. 3 is an enlarged frontal view of the activating device; and

FIG. 4 is a partially illustrated longitudinal cross-section of the activating device.

DETAILED DESCRIPTION OF THE PREFERRED EMBODIMENT

Referring now in detail to the drawings wherein like parts are designated by like reference numerals throughout, there is illustrated in FIG. 1 a back rest for a motor vehicle seat having, as is well known, two lateral longitudinal beams 1, which back rest can be adjusted in its angle of inclination by means of respective hinge fittings 2 about a pivot axis running laterally to the back rest, and which can be folded forward about a folding axis 4 parallel to the pivot axis 3 to facilitate access to the back seat of the vehicle. A shell-like upholstery support 5 is connected with the two longitudinal beams 1. The side piece of the back rest, which is indicated only as to its shape, is designated by reference numeral 6.

A hook-like locking member 7 of a folding lock is mounted on the portion 2' of each of the two hinge fittings 2 that is pivotably mounted on the folding axis 4. In its locking position each such hook-like locking member 7 engages beneath an associated pin provided on the seat frame and thereby locks the portion 2' in place relative to the seat frame. The locking member 7, as viewed according to FIG. 2, can be pivoted counterclockwise out of the illustrated locking position against the force of a return spring into its release position. For this purpose, the core of a Bowden cable 8 is connected with the locking member 7 at a distance from the pivot axis of such member. This Bowden cable 8 is covered and is guided upward to an activating device designated generally by reference numeral 9, which is provided on the rear of the back rest at a distance from the upper edge thereof.

The activating device 9 includes a cup-like carrier or support 10 which is attached to the upholstery support 5 on the side facing the upholstery, namely, as shown in the exemplary embodiment in FIG. 1, in the center between the two longitudinal beams 1. As shown in FIG. 4, the center portion of the floor of the support 10 is drawn in somewhat. FIG. 4 also shows that a support plate 11 is arranged approximately at the height of the edge of the support 10 directed toward the upholstery support 5. This support plate 11 is spaced from the floor of the support 10 by two sleeves and is securely connected thereto by two connecting pins 12 (FIG. 3) that pass through sleeves. Respective bolts 15 are rotatably and axially immovably mounted in the support 10 or support plate 11 by means of respective bushings 13 and 14. The bolt 15 passes through an opening in the upholstery support 5 and, on its end section that projects beyond the rear side of the upholstery support 5, a hand wheel 16. This hand wheel 16 is connected with the bolt 15 so as to rotate therewith and is axially immovable relative thereto. The hand wheel 16 is also provided with a plurality of spaced peripheral depressions 17 which serve as grip ridges and facilitate the grasping of the hand wheel with the fingers of a hand.

A double-armed pivot lever 18 is arranged on the bolt 15 to rotate therewith and be axially immovable relative thereto. This lever 18 is located immediately adjacent to the support plate 11 between the support 10 and the support plate 11, and its two levers are formed symmetrically with respect to the bolt 15. The cores of the two Bowden cables 8 are connected with the respective levers at equal distances from the center of the bolt 15. For this purpose, in the exemplary embodiment the two bushings 19 provided on the core ends have laterally projecting pins 20 which engage rotatably in a bore 21 of the double-armed pivot lever 18. On both Bowden cables 8, the end of the cover surrounding the core and adjacent to the bushing 19 is, as shown in FIG. 3, supported and secured on respective projections on the support plate 11.

If the hand wheel 16 is turned to rotate the bolt 15 in a counterclockwise direction as viewed in FIG. 3, then the double-armed pivot lever 18 performs a corresponding pivot movement in which the cores of the two Bowden cables 8 are pulled a bit further out of their respective covers. This causes the two locking members 7 to pivot synchronously out of the locking position into the release position. Because a shank spring 22 engages on the double-armed pivot lever 18, which spring has a plurality of coils disposed around the bushing 13 and is also supported against a connecting pin 12, one need only release the hand wheel 16 to effect a return of the double-armed pivot lever 18 into the original position. During this process the return springs that act on the two locking members 7 return them into their locking position.

As shown particularly in FIG. 4, a second lever 23, which is also double-armed, is rotatably mounted on the bushing 13 between the double-armed pivot lever 18 and the floor of the support 10 immediately adjacent to said floor. The material difference between this lever 23 and the pivot lever 18 is that each of the two free lever ends of the lever 23 support a tab that is bent at a right angle to the double-armed pivot lever 18 and serves as a carrier 24 for the double-armed pivot lever 18. As with the double-armed lever 18, respective bushings 25 are hinged to the lever 23, which is formed symmetrically relative to the bolt 15. These bushings 25 lie diametrically opposite each other relative to the bolt 15 and are located at equal distances from its center. The ends of respective additional Bowden cables 26 are secured in these two bushings. As shown in FIG. 1, the two additional Bowden cables 26 are guided to the upper end section of the respective longitudinal beams. There they are connected with respective elongated rings 27 provided on the outside of the longitudinal beams 1. The cover of the additional Bowden cables 26 is supported by the carrier 10 and is secured thereto, as shown in FIG. 3. For this purpose the carrier 10 has two diametrically opposite recesses 28 in its raised edge. These recesses 28 serve, as do two diametrically opposite recesses 29, to permit the Bowden cables to pass through.

If one of the two rings 27 is pulled, then the lever 23 is rotated counterclockwise as viewed in accordance with FIG. 3. As it does so the two carriers 24 come to rest against the rear edge of the two free end sections of the double-armed pivot lever 18 and carry it further with them. As with a rotary movement induced by means of the hand wheel 16, this results in the two locking members 7 being pivoted into their release positions. Because this pivot movement of the double-armed lever 18 stretches the shank spring 22, the ring 27 need only be released in order to pivot both the double-armed pivot lever 18 and the lever 23 back into their original position.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A back rest for a vehicle seat, particularly a motor vehicle seat, which is adjustable in its angle of inclination about a pivot axis running in the direction lateral to the back rest and which can be folded about a folding axis lying parallel to the pivot axis and is provided on its two sides with respective folding locks that must be released for a folding movement, each of said folding locks having a locking member which is movable between a locking position and a release position, and each of said folding locks being connected with one end of a cable for activation purposes, comprising: an activating device arranged on the supporting portions of the back rest, said activating device being connected with the other end of said cable wherein said activating device has a support for a bolt, which support is immovable relative to the back rest, wherein a double-armed pivot lever is arranged on the bolt, the two arms of which lever being connected with respective cores of the two cables at a distance from the rotational axis of said lever, wherein the covers of said cables are supported on the support and wherein the double-armed pivot lever is connected with an activating member, further comprising;

at least one additional cable, one end of which is coupled with the double-armed pivot lever, and the other end thereof is connected with a pulling member that is provided on the side of the back rest and is gripped by hand.

2. The back rest according to claim 1, wherein the activating device is arranged on the rear side of the back rest with said bolts pointing rearwardly with respect to said back rest.

3. The back rest according to claim 1, wherein the double-armed pivot lever and the activating member are arranged on the bolt so as to rotate therewith.

4. The back rest according to claim 1, wherein the activating member is a hand wheel.

5. The back rest according to claim 4, wherein the hand wheel has a plurality of depressions spaced about the periphery thereof to serve as grip enhancing means.

6. The back rest according to claim 1, wherein a pulling member is provided on both sides of the back rest.

7. The back rest according to claim 1, wherein the pulling member has the form of a chain link.

8. The back rest according to claim 1, wherein a second lever is rotatably mounted on the bolt axially adjacent to the double-armed pivot lever, said second lever being provided with at least one carrier which is adapted to engage with the double-armed pivot lever for the rotational movement of said second lever and said double-armed pivot lever in the same rotational direction for pivoting of the locking member into its release position.

9. A back rest for a vehicle seat, particularly a motor vehicle seat, which is adjustable in its angle of inclination about a pivot axis running in the direction lateral to the back rest and which can be folded about a folding axis lying parallel to the pivot axis and is provided on its two sides with respective folding locks that must be released for a folding movement, each of said folding locks having a locking member which is movable between a locking position and a release position, and each of said folding locks being connected with one end of a cable for activation purposes, comprising: an activating device arranged on the supporting portions of the back rest, said activating device being connected with the other end of said cable wherein said activating device has a support for a bolt, which support is immovable relative to the back rest, wherein a double-armed pivot lever is arranged on the bolt, the two arms of which lever being connected with respective cores of the two cables at a distance from the rotational axis of said lever, wherein the covers of said cables are supported on the support and wherein the double-armed pivot lever is connected with an activating member;

wherein the double-armed pivot lever and the activating member are arranged on the bolt so as to rotate therewith, and;

wherein one end of at least one additional cable is coupled with the double-armed pivot lever, and the other end thereof is connected with a pulling member that is provided on the side of the back rest and is gripped by hand.

10. The back rest according to claim 9, wherein a pulling member is provided on both sides of the back rest.

11. The back rest according to claim 10, wherein a second lever is rotatably mounted on the bolt axially adjacent to the double-armed pivot lever, said second lever being provided with at least one carrier which is adapted to engage with the double-armed pivot lever for the rotational movement of said second lever and said double-armed pivot lever in the same rotational direction for pivoting of the locking member into its release position.

* * * * *